United States Patent Office 3,632,617
Patented Jan. 4, 1972

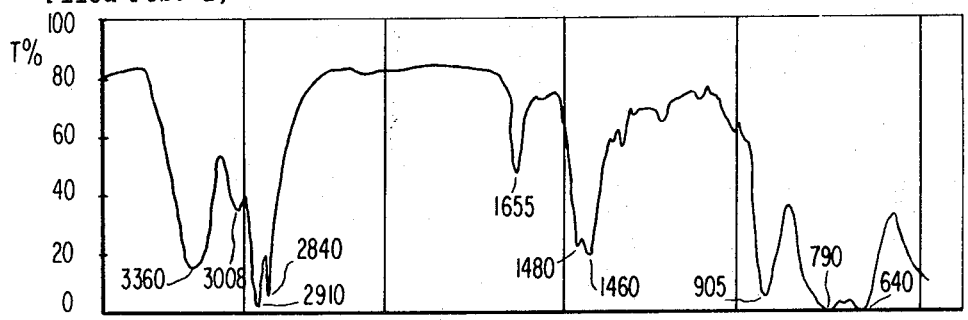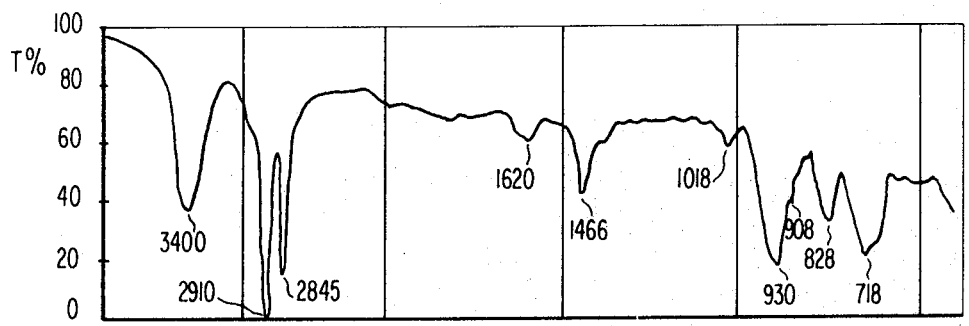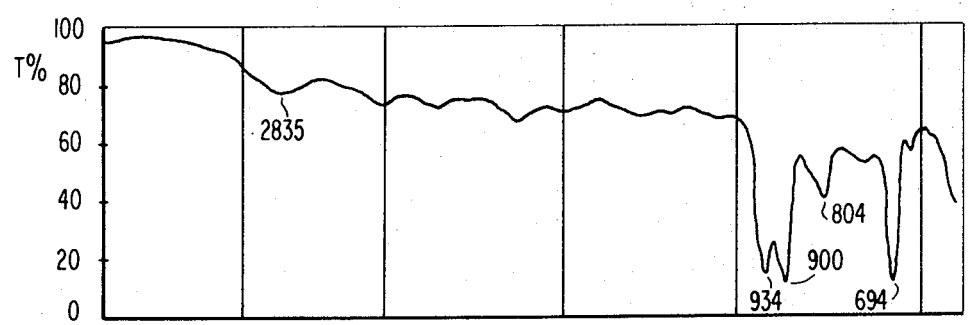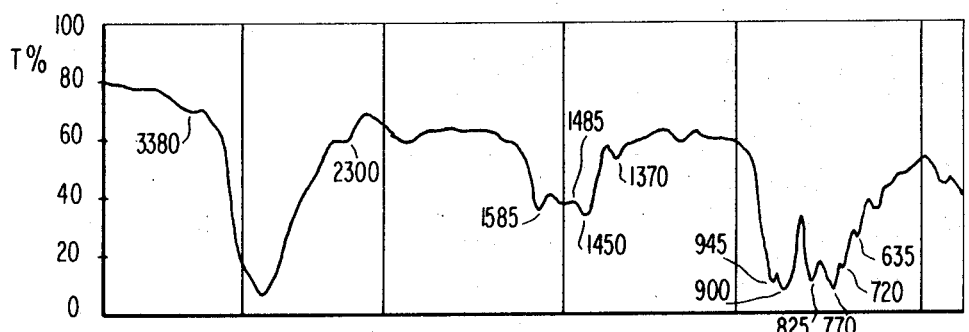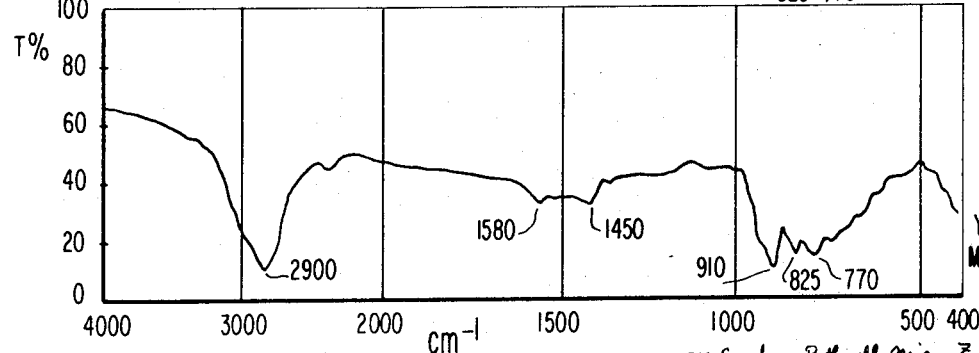

3,632,617
ORGANO-VANADIUM COMPOUND
Yoshiaki Suzuki and Masayoshi Tsuboi, Saitama, Japan, assignors to Fuji Photo Film Co., Ltd., Kanagawa, Japan
Filed Feb. 1, 1968, Ser. No. 702,398
Claims priority, application Japan, Feb. 1, 1967, 42/6,516
Int. Cl. C07f 9/00; G03g 9/02
U.S. Cl. 260—429                                       1 Claim

ABSTRACT OF THE DISCLOSURE

An organo-vanadium compound prepared by the reaction of a member selected from the group consisting of a compound represented by the general Formula I

Figure 6:
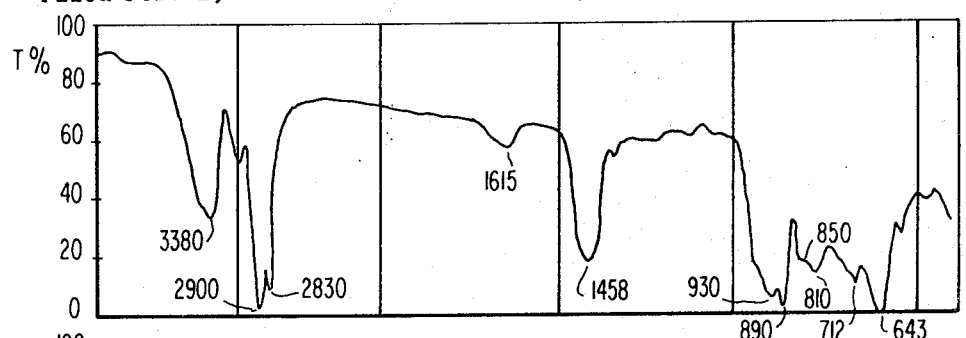

(I)

wherein $R_1$ represents a member selected from the group consisting of a monovalent hydrocarbon group having 6–21 carbon atoms and a derivative thereof; $R_2$, $R_3$, and $R_4$, which may be the same or different, each represents a member selected from the group consisting of a hydrogen atom and a hydrocarbon group; and $X^-$ represents an anion, and a compound represented by the general Formula II

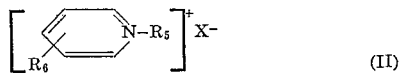
(II)

wherein $R_5$ represents a member selected from the group consisting of a monovalent alkyl group having 1–12 carbon atoms, a phenyl group, a benzyl group, $COOR_6$, and $-CH_2-NHCOR_6$; $R_6$ represents a member selected from the group consisting of an alkyl group having 1–12 carbon atoms and a halogen atom; and $X^-$ represents an anion, with a compound represented by the general Formula III

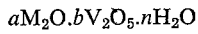
$$aM_2O.bV_2O_5.nH_2O$$

wherein M represents a member selected from the group consisting of ammonium and a metal providing monovalent cation; $a$ and $b$ each represents an integer; and $n$ is a number of 0–18.

BACKGROUND OF THE INVENTION

The present invention relates to an organo-vanadium compound and more particularly the invention relates to an organo-vanadium compound which is not decomposed by air or humidity and which can be used for recording materials. The invention further relates to a process for preparing such an organo-vanadium compound.

By "organo-vanadium compound" in this invention is meant an organic compound containing vanadium, carbon, and nitrogen in the molecule and less than 8 g. of which is dissolved in water when added to 100 g. of water at 20° C.

An object of this invention is to provide an organo-vanadium compound containing in the molecule vanadium, carbon, and nitrogen.

Another object of this invention is to provide an organo-vanadium compound weakly soluble in water and soluble in organic solvents.

A further object of this invention is to provide an organo-vanadium compound capable of providing a clear color by reaction with an aromatic polyhydroxy compound.

Still another object of this invention is to provide a process for preparing the aforesaid organo-vanadium compound.

BRIEF DESCRIPTION OF THE INVENTION

The organo-vanadium compound can be prepared by the reaction of a compound represented by general Formula I or general Formula II

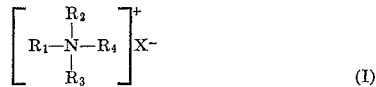
(I)

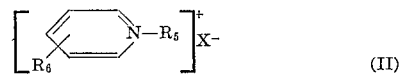
(II)

wherein $R_1$ represents a monovalent hydrocarbon group having 6–21 carbon atoms or a derivative thereof (which may have one or more side chain bonds or one or more unsaturated bonds); $R_2$, $R_3$, and $R_4$, which may be the same or different, each represents a hydrogen atom, a hydrocarbon group (which may have one or more side chain bonds or one or more unsaturated bonds); $X^-$ represents an anion; $R_5$ represents a monovalent alkyl group having 1–12 carbon atoms, a phenyl group, a benzyl group, $COOR_2$, or $-CH_2-NHCO-R_6$; and $R_6$ represents an alkyl group having 1–12 carbon atoms or a halogen atom with a compound represented by general Formula III

$$aM_2O.bV_2O_5.nH_2O \qquad (III)$$

wherein M represents a metal giving a monovalent cation or ammonium; $a$ and $b$ each represents an integer; and $n$ represents a number of 0–18.

The organo-vanadium compound of this invention may be prepared in various ways but the following method is simplest and gives the best yields.

DETAILED DESCRIPTION OF THE INVENTION

When the reaction of the compounds is conducted by dissolving the compound represented by general Formula I or II in water and gradually adding the solution to an aqueous solution of the compound represented by general Formula III with stirring, a powdered or a pasty organo-vanadium compound weakly soluble in water is obtained. The reaction product is white or light yellow and can be easily separated from the solution by filtration or centrifugal separation. Generally, after washing with water and drying, the organo-vanadium compound obtained can be separated as a powdered solid or a viscous paste. The organo-vanadium compound thus prepared is weakly soluble in water but soluble in an organic solvent such as an alcohol, a ketone or an ester as well as methyl Cellosolve, ethylene glycol, dimethyl ether, or dimethyl formamide.

The suitable temperature for preparing the organo-vanadium compound of this invention is 0–60° C. preferably 10–35° C. But, if the solubility of reagents in water is low, the reaction must be conducted in above 60° C. Usually if the temperature is too high, the yield for the organo-vanadium compound is reduced and in some cases the product has a yellow color.

The compound represented by general Formula I or II is substantially soluble in water but some of the compounds represented by general Formula III are weakly soluble in cold water or have a low rate of dissolution in cold water, which requires heating the system to dissolve the compound.

The reaction generally starts within 5 minutes after mixing and usually is finished in 30–60 minutes. Frequently, the reaction product is produced in a colloidal state rendering separation of the product difficult. Increasing the reaction temperature to about 60° C. to grow the product particles into gross particles facilitates separation of the product.

For conducting the reaction effectively, it is preferable to adjust the concentration of the aqueous solution of the nitrogen-containing compound shown by general Formula I or II and the concentration of the aqueous solution of the inorganic vanadium compound shown by general Formula III to 1–20%, preferably 1.5–7% by weight. If the concentration of the aqueous solution is lower, than 1% by weight, the reaction product tends to be produced in a colloidal state, which makes the separation of the product difficult.

The pH of the reaction system has a large effect on the color and the yield of the organo-vanadium compound formed. In particular, it is necessary to control the pH of the aqueous solution of the inorganic vanadium compound represented by general Formula III. The suitable pH thereof is 5.0–11.0, preferably 6.0–10.0. The optimum pH is 6.5–9.0. If the pH of the reaction system is lower than 5.5, the organo-vanadium compound tends to be colored light yellow and in particular if lower than 5.0, the product is colored yellow. On the other hand, if the pH is higher than 10.0, the yield is reduced gradually and if the pH is 11.0 or higher, the yield becomes very low.

The reaction product is sufficiently washed with water to remove unreacted materials and then dried.

Drying may be conducted by a reduced-pressure drying or freeze-drying. In some cases the organo-vanadium compound may be dissolved in, for example, an alcohol-water mixed solvent and then spray-dried. In the case of drying the organo-vanadium compound as a powdered solid or a kneaded paste under a reduced pressure, the drying temperature and the drying time are the important factors for obtaining an organo-vanadium compound having a good quality. When the product is dried for longer than 2 hours at a drying temperature of higher than 70° C., the organo-vanadium compound tends to become a very viscous paste, which makes the subsequent treatment troublesome. Thus, the drying procedure under a reduced pressure is preferably conducted by drying under reduced pressure for about one hour at about 65° C. ($\pm 15°$ C.) and thereafter drying for a long period of time at about 45° C. ($\pm 15°$ C.).

As the solvent for the reaction, water is most preferable but the reaction may be conducted in a mixed solvent of water and an organic solvent miscible with water, such as, an alcohol, a ketone and an ester. In some cases, by carrying out the reaction in a mixed solvent of water and a considerably large proportion of an organic solvent and pouring the reaction product in a large volume of water, there may be produced uniform fine particles of the organo-vanadium compound which can be separated easily.

As suitable hydrocarbon groups having 6–21 carbon atoms or the derivatives thereof designated by $R_1$ in aforesaid general Formula I, there are mentioned straight chain or side chain alkyl groups, a phenyl group, a cyclohexyl group, a benzyl group, a p-tolyl group, a p-methoxyphenyl group, a p-methoxybenzyl group, a dodecylbenzyl group, a p-chlorobenzyl group, a phenethyl group, a p-methylphenethyl group, a 3-phenylpropyl group, a 4-phenylbutyl group and the like.

As the suitable hydrocarbon groups designated by $R_2$, $R_3$ and $R_4$ in general Formula I, there are illustrated an alkyl group having 1–4 carbon atoms, a phenyl group, a benzyl group, a dodecylbenzyl group, a 2-hydroxyethyl group, and the like. As the suitable anion designated by $X^-$, there are mentioned chlorine ion, bromine ion, iodine ion, hydroxyl group ion, acetate ion and the like.

Typical examples of the compound shown by general Formula I are as follows:

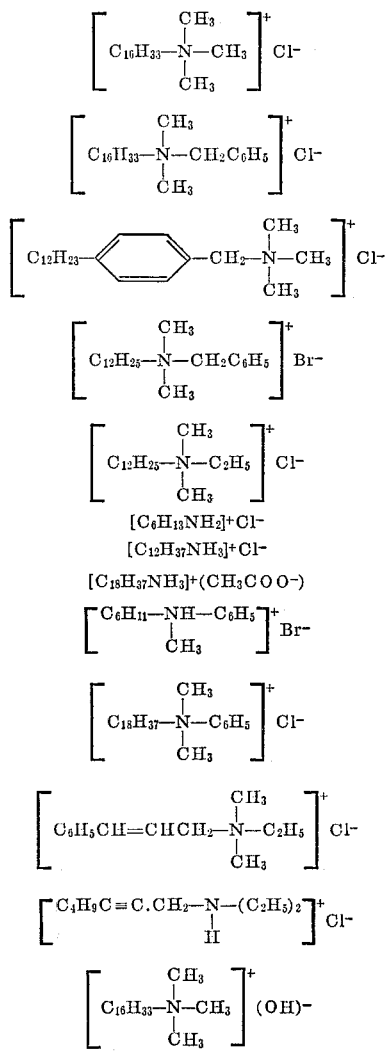

Typical examples of the compound shown by general Formula II are as follows:

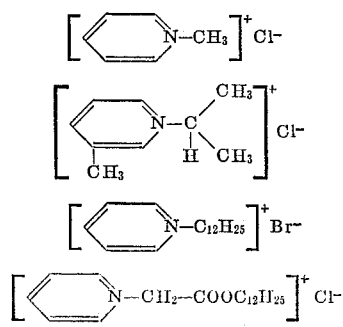

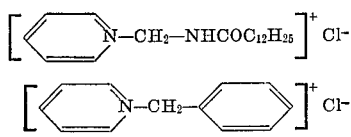

Typical examples of the compound represented by general Formula III are as follows:

Na$_3$VO$_4$,
Na$_3$VO$_4$·16H$_2$O,
NaVO$_3$,
NaVO$_3$·H$_2$O,
NaVO$_3$·2H$_2$O,
NaV$_2$O$_7$·nH$_2$O,
NH$_4$VO$_3$,
KVO$_3$, and
LiVO$_3$·2H$_2$O.

The valence of the vanadium of the compound shown by general Formula III is 5 but the compound may include a small amount of impurities having lower valences.

In the case where the inorganic vanadium compound shown by general Formula III is dissolved in water and the pH of the solution is maintained at 6.0–10.0, there exists in the aqueous solution such poly-vanadate ions as [V$_2$O$_7$]$^{4-}$, [V$_4$O$_{13}$]$^{4-}$, and [V$_5$O$_{16}$]$^{3-}$, and by reacting such polyvanadate ions with the nitrogen-containing compound shown by general Formula I or II, the organo-vanadium compound of this invention may be prepared.

The exact number ($n$) of the water of crystallization of the compounds shown by general Formula III is not known in general. However, $n$ is usually 0, 1, 2, 4, 10, or 16. Furthermore, when the compound shown by general Formula III has absorbed water, it can also be used for the preparation of the organo-vanadium compound of this invention.

Organo-vanadium compounds are usually sensitive to air or water but the organo-vanadium compounds of this invention are very light-stable and very stable to air and humidity. Moreover, they are white or light yellow and weakly soluble in water and soluble in various organic solvents. The organo-vanadium compounds of this invention are novel compounds.

Moreover, the organo-vanadium compound of this invention provides a clear color by reaction with an aromatic polyhydroxy compound such as catechol, protocatechuic acid, gallic acid ethyl ester, 1-hydroxy-2-naphthoic acid, or the like, and the durability of the color thus formed is high. Therefore, the organo-vanadium compounds of this invention can be utilized as coloring component for recording materials such as heat-sensitive recording papers or as toners for electrophotography together with the aforesaid aromatic hydroxy compounds as the coloring component.

In this case, since the organo-vanadium compound itself is white or pale light yellow, in the case of utilizing the compound for heat-sensitive recording papers, very vivid black or blue images can be produced on almost white sheets.

The following examples illustrate the preparation of the organo-vanadium compounds of this invention.

EXAMPLE 1

Into 125 ml. of distilled water was dissolved 9.7 g. of sodium metavanadate under heating and thereafter the solution formed was cooled by ice. In this case, if cooling was not sufficient, the compound obtained would be colored. In a separate flask equipped with a dropping funnel and an agitator, 19.8 g. of dimethylcetylbenzyl ammonium chloride was dissolved in 190 g. of distilled water under heating and then the solution was cooled. Then, the aqueous solution of sodium metavanadate prepared above was added to the solution through the dropping funnel very slowly while stirring the system vigorously to form a white precipitate. During the procedure, the system was preferably stirred as the precipitates are pasty in the system and tend to stick to each other if the stirring is discontinued. The system was stirred further for 10 minutes after the end of the addition; the precipitates were recovered by filtration under suction, washed sufficiently with water, and then dried under reduced pressure at 40° C. to provide 20 g. of a white and slightly pasty solid which was insoluble in water. The product could be dissolved in ethanol, ethyl acetate and the like and when the product was dissolved to react with catechol in ethanol, a black color was obtained. The infrared absorption spectrum of the product is shown in FIG. 1.

EXAMPLE 2

In a reaction vessel as in Example 1, 37.8 g. of dimethylethylcetylammonium chloride was dissolved in 350 ml. of distilled water while heating and the solution was cooled. To the solution was added slowly a solution of 19.4 g. of sodium metavanadate in 250 ml. of distilled water. By processing the precipitates thus formed as in Example 1, 43 g. of an almost white product insoluble in water was obtained. The melting point of the product was 185–195° C. (decomp.). The infrared absorption spectrum of the product is shown in FIG. 2. The product was very soluble in ethyl alcohol and ethyl acetate.

EXAMPLE 3

In the same-styled reaction vessel as in Example 1, 1.4 g. of n-hexylamine hydrochloride was dissolved in 10 ml. of distilled water and the solution thus prepared was cooled. To the solution was added slowly an aqueous solution of 2.5 g. of sodium metavanadate in 30 ml. of distilled water to form precipitates, which were processed as in Example 1 to provide 1.2 g. of a white powder of the product having a melting point of 166–174° C. (decomp.). The infrared absorption spectrum of the product is shown in FIG. 3.

EXAMPLE 4

In the same reaction vessel as in Example 1, 8.3 g. of 2-ethylhexylamine hydrochloride was dissolved in 100 ml. of distilled water and to the solution was added slowly an aqueous solution of 12.6 g. of sodium metavanadate in 200 ml. of distilled water to form white precipitates. By processing the precipitates as in Example 1, 6.7 g. of an almost white solid insoluble in water and having a melting point of 146° C. (decomp.) was obtained. The infrared absorption spectrum of the product is shown in FIG. 4.

EXAMPLE 5

In the same reaction vessel as in Example 1, 49.6 g. of 2-ethylhexyl amine hydrochloride was dissolved in 400 ml. of 15% ethyl alcohol–85% water and to the solution was added slowly an aqueous solution of 18.4 g. of sodium ortho-vanadate of which the pH had been adjusted to 9.0 and which was heated at 65° C. for one hour to form white precipitates. The precipitates were recovered by filtration under suction, washed sufficiently with water, and then dissolved in 450 g. ethanol, and dried by spray-drying. By treating the precipitates as in Example 1, 40 g. of an almost white and viscous product was obtained. The infrared absorption spectrum of the product is shown in FIG. 5.

EXAMPLE 6

In the same reaction vessel as in Example 1, 34.7 g. of trimethylstearyl ammonium chloride was dissolved under heating in 250 ml. of distilled water and the solution was cooled. To the solution was added dropwise an aqueous solution of 19.4 g. of sodium metavanadate in 300 ml. of distilled water to form precipitates, which were processed as in Example 1 to provide 48 g. of a white water-insoluble solid having a melting point of 204–208° C. (decomp.). The infrared absorption spectrum of the product is shown in FIG. 6. The product was very soluble in ethanol and soluble in ethylacetate, tributyl phosphate and hexadecylalcohol.

EXAMPLE 7

Into 45 g. of distilled water was dissolved under heating 3.0 g. of sodium metavanadate and after cooling by ice, the solution thus prepared was placed in a separate flask equipped with a dropping funnel and an agitator. A mixture of 18 g. of a 25% methanol solution of hexadecyltrimethyl ammonium hydroxide and 10 g. of methanol was added dropwise through the dropping funnel to the solution prepared above. While continuing stirring for one hour, 50 g. of distilled water was added to the system and the system was heated to 30° C. The precipitates thus formed were recovered by filtration and freeze-dried to provide 5.6 g. of a pale yellow water-insoluble solid having a melting point of 212–216° C. (decomp.).

Infrared absorption spectrum: 928 cm.$^{-1}$ (strong), 809 cm.$^{-1}$ (strong), 712 cm.$^{-1}$ (weak), and 638 cm.$^{-1}$ (strong).

EXAMPLE 8

Into 350 ml. of distilled water was dissolved 2.5 g. of $NH_4VO_3$ under heating and the solution cooled. On the other hand, 6.4 g. of cetyltrimethyl ammonium chloride was dissolved into 50 ml. of distilled water while heating and the solution thus prepared was cooled by ice.

Figure 7:
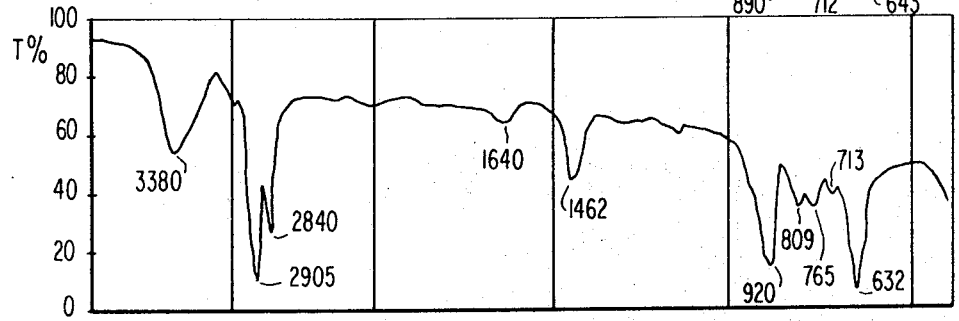

When the aqueous solution of cetyltrimethyl ammonium chloride was added slowly to the aqueous solution of $NH_4VO_3$, a light yellow solid began to be precipitated, which was recovered by filtration under suction, washed with water and dried under reduced pressure at 40° C. to provide 6 g. of a product having a melting point of 208–216° C. (decomp.). The infrared absorption spectrum of the product is shown in FIG. 7.

EXAMPLE 9

Figure 8:
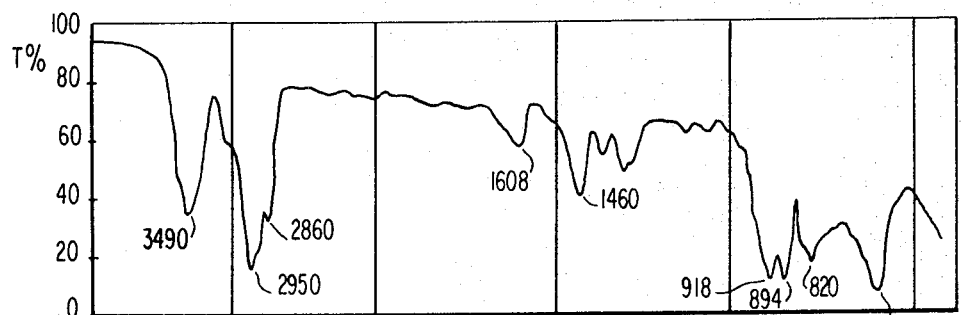

In the same reaction vessel as in Example 1, 35.3 g. of dodecylbenzyltrimethyl ammonium chloride was dissolved in 200 ml. of distilled water under heating and the solution was cooled. To the solution thus prepared was added dropwise slowly an aqueous solution of 19.4 g. of sodium metavanadate in 280 ml. of distilled water with stirring. The precipitates thus formed were treated as in Example 1 to provide 38 g. of a light yellow and slightly viscous product. The infrared absorption spectrum of the product is shown in FIG. 8.

EXAMPLE 10

Figure 9:
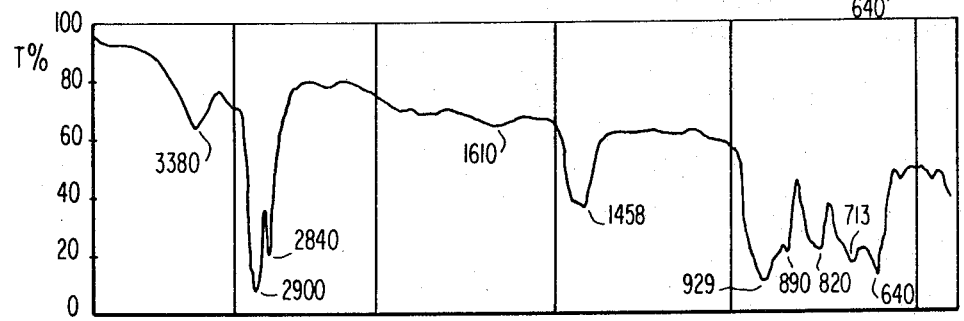

In the same reaction vessel as in Example 1, 32.0 g. of cetyltrimethyl ammonium chloride was dissolved under heating into 250 ml. of distilled water and the solution was cooled. To the solution was added dropwise slowly an aqueous solution of 19.4 g. of sodium metavanadate in 300 ml. of distilled water. By treating the precipitates formed as in Example 1, 38 g. of a white solid was obtained. The melting point of the product was 212–216° C. (decomp.) and hte infrared absorption spectrum thereof is shown in FIG. 9.

EXAMPLE 11

Figure 10:
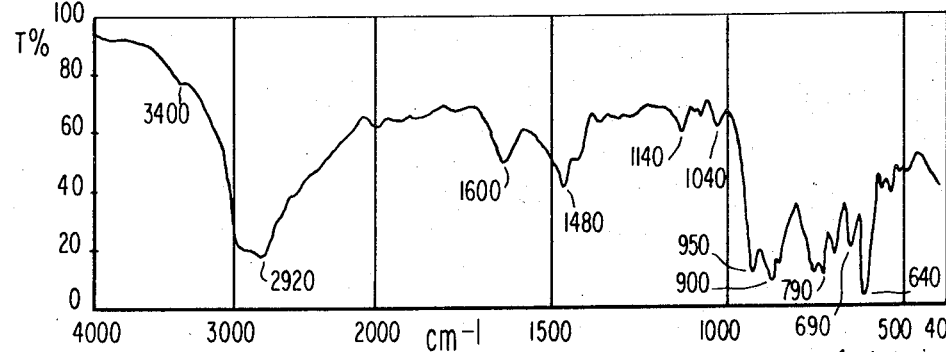

In the same reaction vessel as in Example 1, 15.7 g. of phenylethylamine hydrochloride was dissolved into 25 ml. of distilled water. To the solution was added dropwise slowly an aqueous solution of 19.5 g. of sodium metavanadate in 250 ml. of distilled water and the precipitates thus formed were treated as in Example 1 to provide 17 g. of a white solid, which was colored brown at 180° C. and decomposed at 200° C. The infrared absorption spectrum of the product is shown in FIG. 10.

EXAMPLE 12

Into 130 ml. of distilled water was dissolved under heating 6.8 g. of sodium metavanadate and the solution thus prepared was cooled sufficiently by ice. In a separate flask equipped with a dropping funnel and an agitator, 15.0 g. of dodecylpyridinium bromide was dissolved into 120 ml. of distilled water and the solution was cooled sufficiently. The aqueous solution of sodium metavanadate prepared above was added very slowly to the aqueous solution of dodecylpyridinium bromide through the dropping funnel with stirring to form immediately white turbidity and then to form precipitates. After further continuing the stirring for one hour, the precipitates were filtered under suction, washed with water sufficiently and dried under a reduced pressure at 40° C. to provide 11.0 g. of white solid powders. The melting point of the product was 114° C. (decomp.).

EXAMPLE 13

Into 50 g. of distilled water was dissolved under heating 1.5 g. of sodium metavanadate. In a separate flask equipped with a dropping funnel and stirrer, 3.3 g. of stearylamine acetate was dissolved into 110 g. distilled water in 50°–90° C. The aqueous solution of sodium metavanadate prepared above was added very slowly to aqueous warm solution of stearylamine acetate through the dropping funnel with stirring to form immediately white pasty precipitates. The precipitates were filtered under suction, washed with warm water and dried under reduced pressure at 60° C. for 5 hours to provide 3.7 g. of white pasty solid. The melting point of the product was 144° C. (decomp.). The product was slightly soluble in water or methylalcohol but soluble in decylalcohol, hexadecylalcohol or triethylene glycol. The product reacts with gellic acid in hexadecylalcohol to form black color. The infrared spectrum of the product was:

640 cm.$^{-1}$ (strong), 902 cm.$^{-1}$ (strong), 935 cm.$^{-1}$ (middle), 1465 cm.$^{-1}$ (strong), 1500 cm.$^{-1}$ (middle), 1590 cm.$^{-1}$ (middle), 2900 cm.$^{-1}$ (strong).

What is claimed is:

1. A process for the preparation of an organo-vanadium compound which comprises: dissolving in water a member selected from the group consisting of a compound represented by the general formula (I)

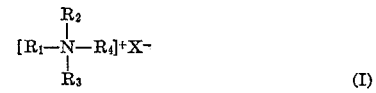

wherein $R_1$ represents a member selected from the group consisting of a monovalent hydrocarbon group having 6–21 carbon atoms and a derivative thereof, $R_2$ and $R_3$, which may be the same or different, each represents a member selected from the group consisting of a hydrogen atom and a hydrocarbon group, $R_4$ is a hydrogen atom, and $X^-$ represents an anion, said compound represented by the general Formula I being present at a concentration of from 1.0 to 20% by weight, and a compound represented by the general Formula II

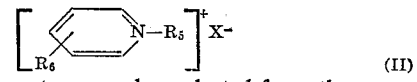

wherein $R_5$ represents a member selected from the group consisting of a monovalent alkyl group having 1–12 carbon atoms, a phenyl group, a benzyl group, $COOR_2$, and $-CH_2-NHCOR_6$, $R_6$ represents a member selected from the group consisting of an alkyl group having 1–12 carbon atoms and a halogen atom, and $X^-$ represents an anion, said compound represented by the general Formula II being present at a concentration of from 1.0 to 20% by weight; said solution of the compound represented by the general Formula I and the general Formula II having a pH of from 5.5 to 10; adding slowly to the solution of (I) and (II) an aqueous solution of a compound represented by the general Formula III $$aM_2O \cdot bV_2O_5 \cdot nH_2O \qquad (III)$$

wherein M represents a member selected from the group consisting of ammonium and a metal providing a monovalent cation, $a$ and $b$ each represents an integer, and $n$ is a number of 0–12, said compound represented by the general Formula III being present at a concentration of from 1.0 to 15% by weight, to cause the reaction of said compounds; and drying the product thus formed under a reduced pressure for about one hour at from 50° C. to 80° C. and subsequently drying under a reduced pressure for a long period of time at from 30° C. to 60° C.

References Cited
UNITED STATES PATENTS

| | | | |
|---|---|---|---|
| 2,134,543 | 10/1938 | Andrews | 23—234 |
| 3,254,102 | 5/1966 | Swanson | 260—429 |
| 2,274,058 | 2/1942 | Goebel te al. | 260—429 |
| 3,203,968 | 8/1965 | Sebba | 260—429.1 |

OTHER REFERENCES

Weissberger: Techniques of Organic Chemistry, vol. III (1950), Interscience Publishers, Inc., New York, N.Y., p. 626, 630–3.

Sidgwick: The Chemical Elements and Their Compounds, vol. I (1950), Oxford University Press, London, p. 811–2.

TOBIAS E. LEVOW, Primary Examiner

A. P. DEMERS, Assistant Examiner

U.S. Cl. X.R.

96—1 SD; 106—288 Q; 252—62.1